US006320335B1

(12) United States Patent
Saitou

(10) Patent No.: US 6,320,335 B1
(45) Date of Patent: Nov. 20, 2001

(54) RECIPROCATING DRIVE DEVICE HAVING RELATIVE-MOVEMENT PREVENTING UNIT

(75) Inventor: Toshihiro Saitou, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/538,497

(22) Filed: Mar. 30, 2000

(30) Foreign Application Priority Data

Sep. 19, 1999 (JP) ..................... 11-267032

(51) Int. Cl.[7] ..................... B60J 1/08

(52) U.S. Cl. ..................... 318/9; 49/502

(58) Field of Search ..................... 318/9, 15; 49/501, 49/502; 74/469, 470; 296/146.1

(56) References Cited

U.S. PATENT DOCUMENTS 4,742,726 * 5/1988 Adam et al. ..................... 74/425
4,967,510 * 11/1990 Torii et al. ..................... 49/358
5,111,715 * 5/1992 Farris ..................... 74/606 R
5,794,480 * 8/1998 Schonsteiner ..................... 74/425
6,075,298 * 6/2000 Maue et al. ..................... 310/12

FOREIGN PATENT DOCUMENTS 2462179 6/1976 (DE) .

* cited by examiner

*Primary Examiner*—Bentsu Ro
(74) *Attorney, Agent, or Firm*—Law Offices of David G. Posz

(57) ABSTRACT

In a reciprocating drive device, for example, in a power window device for a vehicle, a drive member is reciprocated by transmitting a rotating force from a motor to a regulator. A driven gear of the regulator is engaged with a drive gear fixed outside a synthetic resin housing of the motor to an output shaft of the motor. In the reciprocating drive device, a relative movement between the housing of the motor and a support base to which the housing is attached with screws is surely prevented by a relative-movement preventing unit having an engagement structure between the support base and the housing.

15 Claims, 7 Drawing Sheets

RECIPROCATING DRIVE DEVICE HAVING RELATIVE-MOVEMENT PREVENTING UNIT

CROSS-REFERENCE TO RELATED APPLICATION

This application is related to and claims priority from Japanese Patent Application No. Hei. 11-267032 filed on Sep. 21, 1999, the contents of which are hereby incorporated by reference.

BACKGROUND OF THE INVENTION

1. Field of the Invention

The present invention relates to a reciprocating drive device for reciprocating a drive member by transmitting a rotating force from a motor to a regulator having a driven gear meshing with a drive gear fixed outside a housing of the motor. More particularly, the present invention relates to a relative-movement preventing unit of the reciprocating drive device for preventing a relative movement between the housing and a support base for supporting the driven gear.

2. Description of Related Art

A power window device shown in FIGS. 9A–10 is one type of a reciprocating drive device. The power window device includes a motor 1 and an X-arm type regulator 2. The regulator 2 includes a support base 3 fixed to a vehicle door, a lift arm 5 pivotally supported on the support base 3 by a support shaft 17, a sector gear 4 integrally joined to the lift arm 5, an equalizer arm 6 pivotally linked to the lift arm 5, an equalizer bracket 7 for guiding a movement of a lower end of the equalizer arm 6, and a lift arm bracket 8 for guiding movements of an upper end of the equalizer arm 6 and an upper end of the lift arm 5.

FIG. 10 shows an internal construction of an output part 10 of the motor 1. A worm 11 fixed to an output shaft (not shown) of a motor body portion 9 of the motor 1 meshes with a worm wheel 15 fixed to an output shaft 14 in a space enclosed by a housing 12 and a cover 13 of the output part 10. Rotating force from the motor body portion 9 is transmitted to the sector gear 4 through the worm 11, the worm wheel 15, the output shaft 14 and a driving gear 16 fixed to the output shaft 14, and the sector gear 4 turns around the support shaft 17. When the sector gear 4 turns around the support shaft 17, the lift arm bracket 8 moves up or down and a window glass (not shown) mounted on the lift arm bracket 8 moves up or down.

The housing 12 is fixed to the support base 3 by a number of screws 18. In a lock state where the window glass has reached the top of a window frame when the window is fully closed or where the regulator has reached a lower limit when the window is fully open, the housing 12 tries to move with respect to the support base 3 in a direction perpendicular to the output shaft 14. To prevent a relative movement between the motor 1 and the support base 3, it is necessary for the housing 12 to be fixed to the support base 3 strongly. To this end, in this related art device, metal inserts 19 are embedded in the housing 12 which is made of relatively soft synthetic resin, and the screws 18 are screwed into these metal inserts 19.

However, the metal inserts 19 are expensive, and furthermore a troublesome insert-molding process for embedding the metal inserts 19 into the housing 12 is necessary.

SUMMARY OF THE INVENTION

It is therefore an object of the present invention to provide a reciprocating drive device having a relative-movement preventing unit which prevents a relative movement between a motor housing and a support base without using metal inserts.

According to the present invention, a reciprocating drive device for reciprocating a drive member includes a motor having a drive gear disposed outside a motor housing to be rotatable integrally with an output shaft, a regulator having a driven gear mashing with the drive gear, a support base for supporting the driven gear and for fixing the housing, a screw-fixing unit through which the housing is directly screwed to the support base, and a relative-movement preventing unit provided by an engagement between the support base and the housing for preventing a relative movement between the support base and the housing. Thus, even when the housing made of resin and the support base made of metal are directed screwed by screws of the screw-fixing unit, a relative movement between the housing and the support base is prevented by the relative-movement preventing unit without using metal inserts.

Preferably, the relative-movement preventing unit includes a mating projection provided on one of the housing and the support base, and a mating concavity provided on the other of the housing and the support base. Further, the mating projection is fitted into the mating concavity when the housing is fixed to the support base by the screw-fixing unit. Thus, the relative movement between the housing and the support base is further prevented.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention will be described hereinafter with reference to the accompanying drawings.

A first preferred embodiment of the invention will now be described with reference to FIG. 1A through FIG. 3. In the first embodiment, the present invention is typically applied to a power window device that is an example of a reciprocating drive device.

Figure 1B:
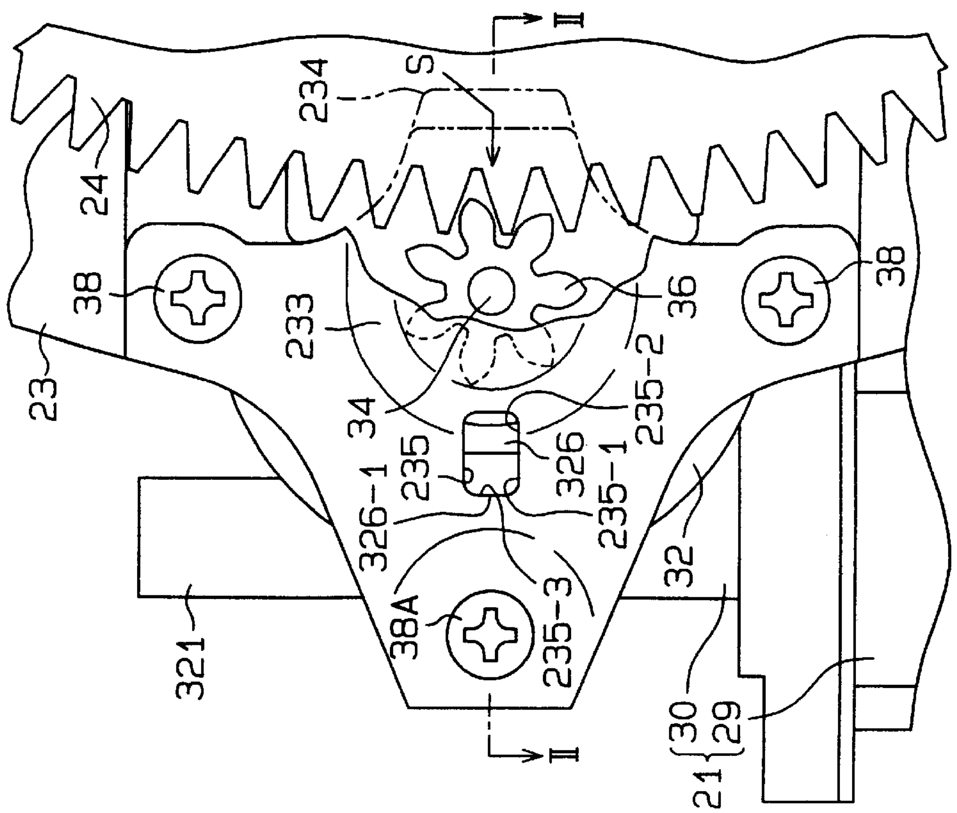
FIG. 1A is a rear view and FIG. 1B an enlarged detail view showing a power window device according to a first preferred embodiment of the invention.
Figure 1A:
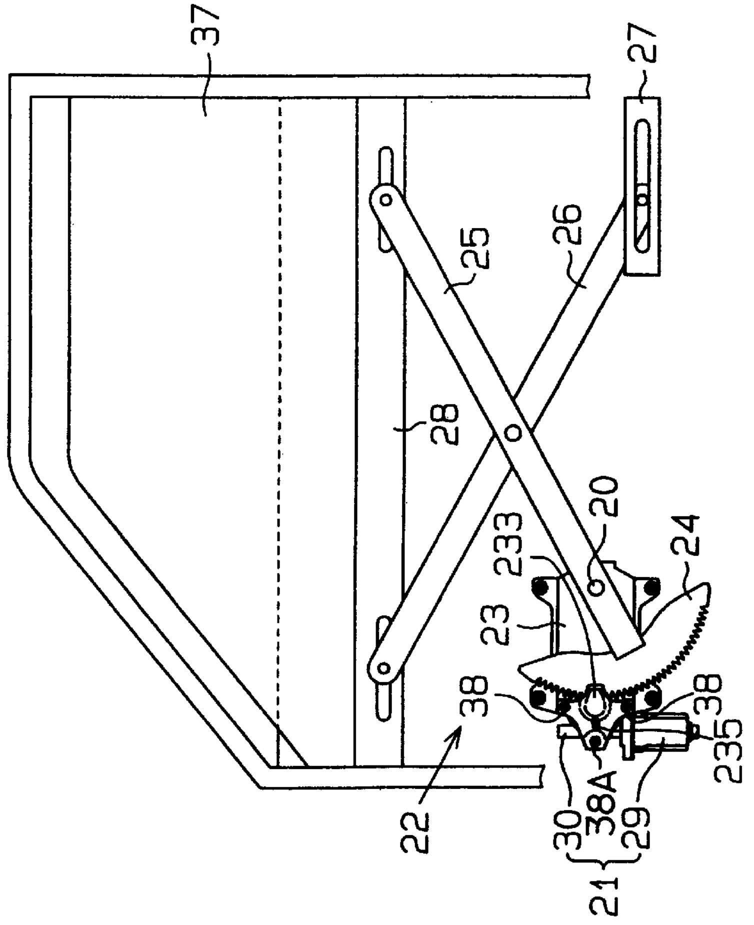

As shown in FIG. 1A, the power window device includes a window glass 37, a regulator 22 for regulating operation of the window glass 37, and a motor 21 for operating the regulator 22. The regulator 22 includes a metal support base 23 fixed to a vehicle door, a lift arm 25 pivotally supported on the support base 23 by a support shaft 20, a sector gear 24 integrally joined to the lift arm 25, an equalizer arm 26 pivotally linked to the lift arm 25, an equalizer bracket 27 for guiding a movement of a lower end of the equalizer arm 26, and a lift arm bracket 28 for guiding movements of an upper end of the equalizer arm 26 and an upper end of the lift arm 25.

The motor 21 includes a motor body portion 29 and an output part 30. A housing 32 of the output part 30 is made of synthetic resin and is fixed to the support base 23 of the regulator 22. The sector gear 24 and the housing 32 are disposed on opposite sides of the support base 23, as shown in FIG. 1B.

Figure 2:
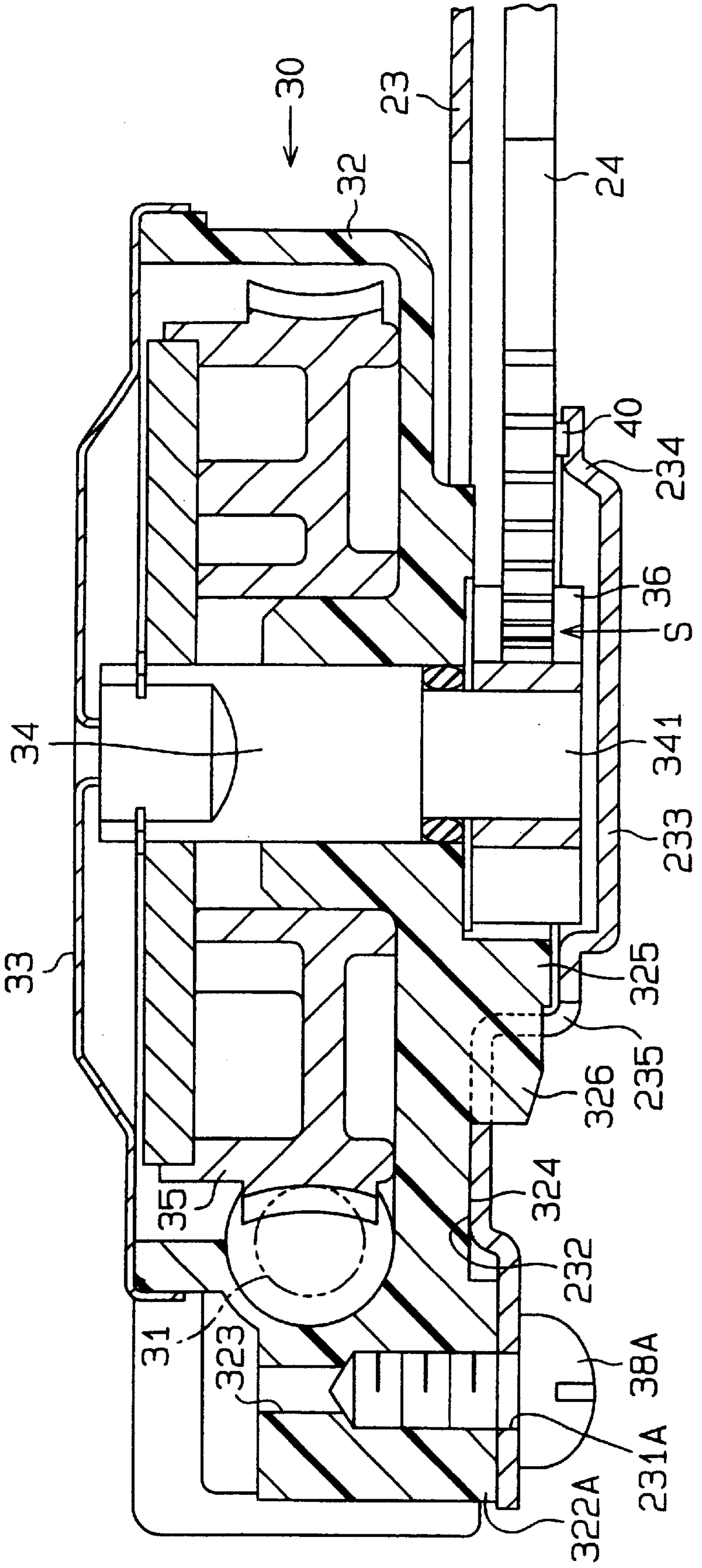
FIG. 2 is an enlarged sectional view taken along line II—II in FIG. 1B.

FIG. 2 shows an internal construction of the output part 30. The motor body portion 29 is mounted on the output part 30 and has a rotating shaft (not shown). A worm 31 is fixed to the rotating shaft of the motor body portion 29 and rotates integrally therewith. The worm 31 rotates inside a worm case part 321 (shown in FIG. 1B and FIG. 3) forming a part of the housing 32 of the output part 30, and a cover 33 is fixed to the housing 32. An output shaft 34 is rotatably disposed in the housing 32, and a worm wheel 35 is fixed to the output shaft 34 in a space enclosed by the housing 32 and the cover 33. The worm wheel 35 is disposed to mesh with the worm 31.

The output shaft 34 of the output part 30 projects to an outside from a facing area 324 of the housing 32, which faces the support base 23 of the regulator 22. A driving gear 36 is disposed on the projecting end 341 of the output shaft 34 projecting from the housing 32, and the sector gear 24 meshes with the driving gear 36. Rotating drive force from the motor body portion 29 is transmitted through the worm 31, the worm wheel 35, the output shaft 34 and the driving gear 36 to the sector gear 24. The sector gear 24, which constitutes a driven gear, turns around the support shaft 20. Thus, the output part 30 has a speed-reducing gear mechanism consisting of the worm 31 and the worm wheel 35. When the sector gear 24 rotates around the support shaft 20, the lift arm bracket 28 moves up or down, and the window glass 37, constituting a drive member, attached to the lift arm bracket 28 moves up or down.

Figure 3:
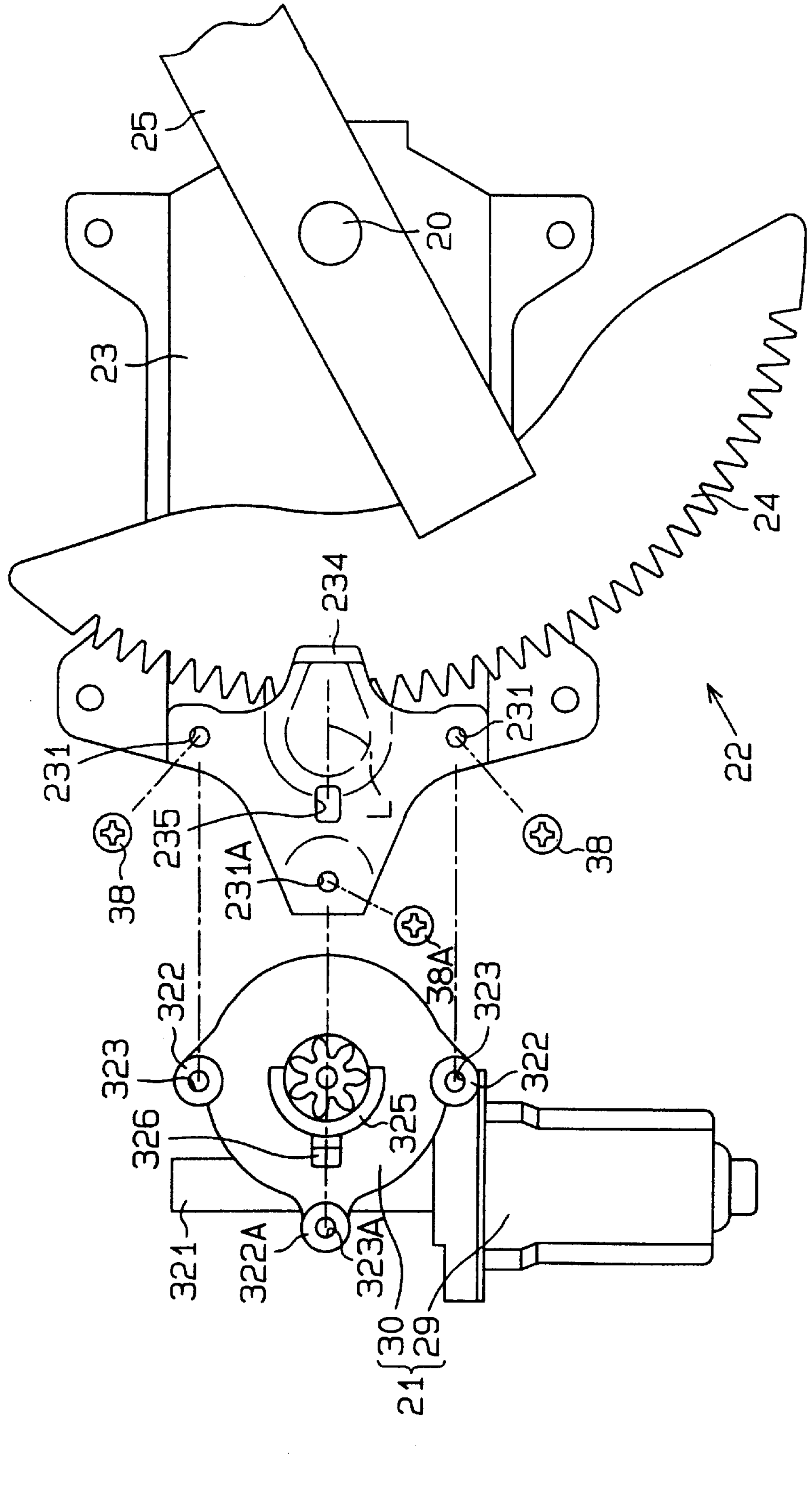
FIG. 3 is an exploded rear view showing the power window device according to the first embodiment.

As shown in FIG. 3, a plurality of (e.g., three in this preferred embodiment) cylindrical attachment parts 322, 322A are formed integrally with the synthetic resin housing 32 of the output part 30, which forms a part of the housing of the motor 21, and attachment holes 323, 323A are provided in these attachment parts 322, 322A, respectively. On the other hand, through holes 231, 231A corresponding with the attachment holes 323, 323A are formed in the support base 23 of the regulator 22. The housing 32 is fixed to the support base 23 by tightening of screws 38, 38A screwed through the through holes 231, 231A into the attachment holes 323, 323A. In at least one of the attachment parts 322, 322A (in this preferred embodiment, the attachment part 322A), the diameter of the through hole (231A) of the support base 23 and the diameter of the screw (38A) at its head end are made substantially the same.

As shown in FIG. 3, a circular arc-shaped reinforcing lip 325 is provided on the facing area 324 of the housing 32 so as to extend a half way around the driving gear 36. A concave cover part 233 is provided to extend from a facing area 232 of the support base 23, which faces the housing 32. The cover part 233 covers the driving gear 36 and the reinforcing lip 325. A pressing part 234 is provided in the cover part 233. The pressing part 234 projects toward a side of the sector gear 24 so as to cover the meshing position S where the sector gear 24 meshes with the driving gear 36. Further, a shoe 40 is provided between the pressing part 234 of the cover part 233 so that the end of the pressing part 234 presses the sector gear 24 to the housing 32 through the shoe 40.

A mating projection 326 is provided on the facing area 324 of the housing 32. The mating projection 326 connects with the reinforcing lip 325. On the other hand, a mating hole 235 is provided in the facing area 232 of the support base 23. When the support base 23 and the housing 32 are joined by the screws 38, 38A being screwed into the attachment holes 323, 323A of the housing 32, the mating projection 326 and the mating hole 235 snugly mate. That is, in this case, the matting projection 326 of the housing 32 is fitted into the mating hole 235 of the support base 23 to be engaged with each other. The mating projection 326 of the housing 32 and the mating hole 235 of the support base 23 are provided extending in a direction intersecting with the output shaft 34 from the meshing position S between the driving gear 36 and the sector gear 24. The attachment part 322A is on a straight line extending in the direction intersecting with the output shaft 34 from the meshing position S.

According to the first embodiment of the present invention, in a lock state where the window glass 37 has reached the top of a window frame when the window is fully closed or where the regulator 22 has reached its lower limit when the window is fully open, a reaction to the rotational drive force of the motor 21 tends to rotate the motor 21 in the opposite direction to its rotating direction with respect to the support base 23. That is, the reaction tends to rotate the housing 32 with respect to the support base 23 in the opposite direction relative to the rotating direction of the motor 21 (i.e., the driving gear 36). The mating (fitting) structure between the mating projection 326 and the mating hole 235 is used as a relative-movement preventing unit between the housing 32 and the support base 23. The cover part 233 covering the driving gear 36 is integrated with the support base 23. That is, the mating projection 326 and the mating hole 235 are fitted between the housing 32 and the support base 23. Therefore, the mating between the mating projection 326 and the mating hole 235 prevents a relative rotation between the support base 23 and the housing 32 about the output shaft 34. Consequently, even when the screws 38, 38A are screwed into the relatively soft synthetic resin housing 32 directly, the relative rotation between the support base 23 and the housing 32 is surely prevented while the strength of the support base 23 is maintained. By using the relative-movement preventing unit constituted by the mating projection 326 and the mating hole 235, it is possible to maintain a stable assembly strength between the support base 23 and the housing 32, without using expensive metal inserts.

Also, because the mating projection 326 of the relative-movement preventing unit is provided in the relatively soft housing 32, the strength of the housing 32 is improved.

The reinforcing lip 325 and the mating projection 326 are disposed in the vicinity of the driving gear 36, and the mating projection 326 and the mating hole 235 are disposed to be engaged with each other in the vicinity of the driving gear 36. Because the reaction relative to the rotational drive force of the motor 21 reaches the housing 32 through the meshing position S between the sector gear 24 and the driving gear 36, the vicinity of the meshing position S between the sector gear 24 and the driving gear 36, i.e. the vicinity of the driving gear 36, is the optimum position for supporting that reaction. Therefore, the vicinity of the driving gear 36 is a preferable position for the fitting of the mating projection 326 and the mating hole 235.

The facing areas 232, 324 of the support base 23 and the housing 32 in the vicinity of the output shaft 34 are preferable positions in which to set the mating hole 235 and the mating projection 326 in order to provide the fitting position (matting position) of the mating hole 235 and the mating projection 326 in the vicinity of the driving gear 36.

Because the reinforcing lip 325 for raising the strength of the housing 32 is connected to the mating projection 326, the strength of the housing 32 and the strength of the mating projection 326 are improved. Increasing the strength of the mating projection 326 is necessary from the point of view of certain prevention of relative rotation between the housing 32 and the support base 23.

A portion 235-2 (shown in FIG. 1B) of the mating hole 235 at a side of the cover part 233 supports (receives) the above-mentioned reaction through the base part of the mating projection 326 at the end thereof connecting with the reinforcing lip 325. Further, a portion 235-1 (shown in FIG. 1B) of the mating hole 235 at a side of the facing area 232 of the support base 23 supports the above-mentioned reaction through the base part of the mating projection 326. With this construction in which the mating hole 235 is made to connect with the cover part 233 and the cover part 233 is thereby also made to support the reaction, the effect of the relative-rotation preventing action is better than in a case where the facing area 232 alone is made to support the reaction.

The fitting of the mating projection 326 and the mating hole 235 also serves to position the housing 32 with respect to the support base 23 and thereby improves the assembling performance and the accuracy of assembly of the motor 21 and the regulator 22.

The pressing action of the pressing part 234 contributes to smooth meshing between the driving gear 36 and the sector gear 24, as shown in FIGS. 1B, 2.

In the lock state, the driving gear 36 tries to escape in the direction intersecting with the output shaft 34 from the meshing position S. That is, a reaction tending to move the driving gear 36 and the sector gear 24 apart acts in the direction intersecting with the output shaft 34 from the meshing position S. This force urging escape (escape force) is supported (received) by the fitting (mating) of the mating projection 326 and the mating hole 235. The mating projection 326 and the mating hole 235 are provided along in the direction intersecting with the output shaft 34 from the meshing position S, and the escape force is supported by the end face 326-1 of the mating projection 326 and an end face 235-3 of the mating hole 235 in a radial direction of the driving gear 36. Therefore, the escape force is supported by the mating of the mating projection 326 and the mating hole 235 most effectively. That is, the best mating position for the mating projection 326 and the mating hole 235 for preventing relative movement between the support base 23 and the housing 32 in the direction intersecting with the output shaft 34 from the meshing position S is on the line L of the direction intersecting with the output shaft 34 from the meshing position S.

In the first embodiment, the synthetic resin is preferable as the material of the housing 32.

Because the diameter of the head end of the screw 38A and the diameter of the through hole 231A are substantially equal, the periphery of the head end of the screw 38A and the periphery of the through hole 231A are in contact all the way around. Consequently, in addition to the mating of the mating projection 326 and the mating hole 235, the position determination between the motor 21 and the regulator 22 is also effected by the screw 38A and the through hole 231A. The position determination effected by the screw 38A and the through hole 231A contributes to increases in the ease of assembly and the accuracy of assembly of the motor 21 and the regulator 22 and the accuracy of the meshing of the driving gear 36 and the sector gear 24. Also, the screw 38A and the through hole 231A support the forces acting in the rotation direction and in the escape direction between the housing 32 and the support base 23. Thus, the relative movement between the housing 32 and the support base 23 is further prevented.

Further, in the first embodiment, the cover part 233, having a three-dimensional structure, contributes an increase in strength to the support base 23.

Figure 4:
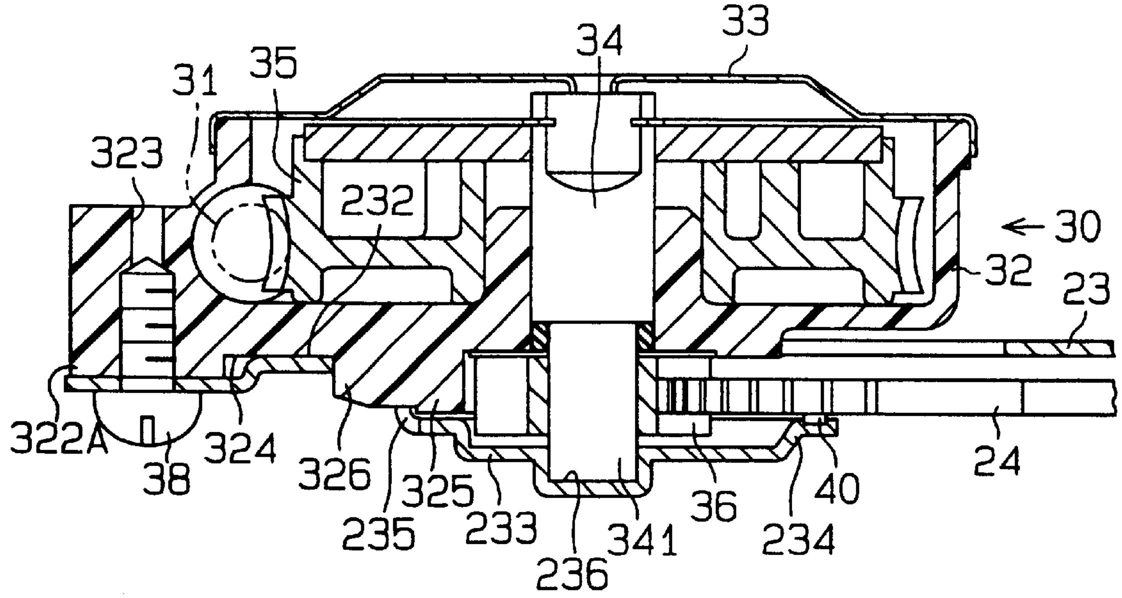
FIG. 4 is a sectional view showing an inner structure of a reciprocating drive device according to a second preferred embodiment of the present invention.

A second preferred embodiment illustrated in FIG. 4 will now be described. In FIG. 4, the same parts as those in the first preferred embodiment have been given the same reference numerals as in the first preferred embodiment.

In second embodiment, a bearing hole 236 is formed in the cover part 233, and the projecting end 341 of the output shaft 34 is rotatably fitted in the bearing hole 236. This construction in which the output shaft 34 and the bearing hole 236 are fitted contributes to increases in the ease of assembly and the accuracy of assembly of the motor 21 and the regulator 22 and the accuracy of the meshing between the driving gear 36 and the sector gear 24.

Figure 5:
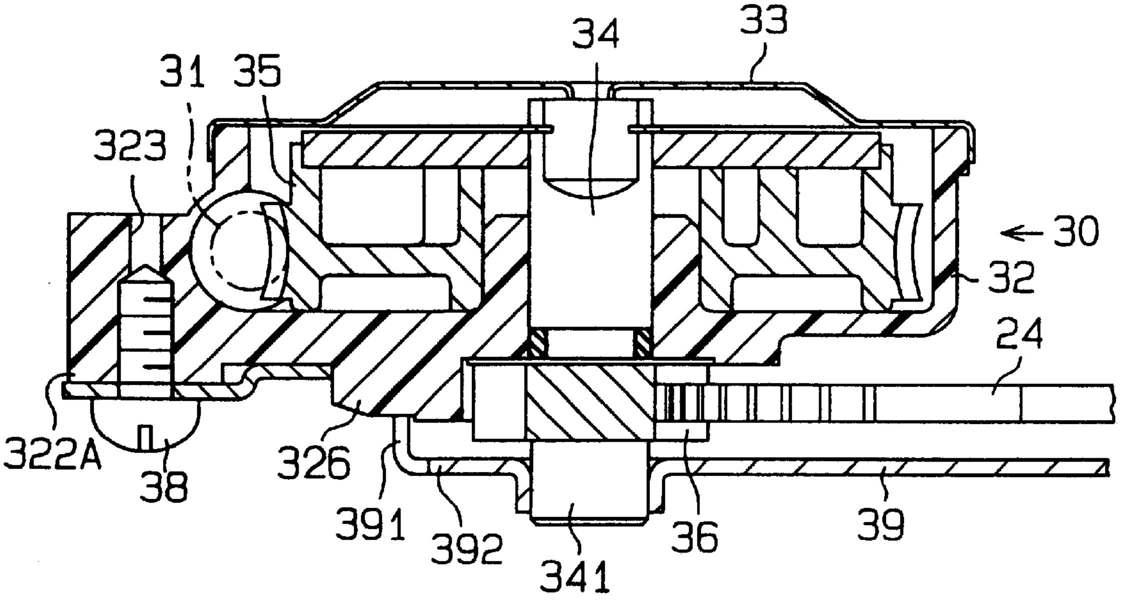
FIG. 5 is a sectional view showing an inner structure of a reciprocating drive device according to a third preferred embodiment of the present invention.

A third preferred embodiment illustrated in FIG. 5 will now be described. In FIG. 5, the same parts as those in the first preferred embodiment have been given the same reference numerals as in the first preferred embodiment.

The sector gear 24 and the housing 32 in the third preferred embodiment are disposed on the same side of a support base 39. A mating hole 391 is formed in the support base 39 so as to connect with a cover part 392 covering the driving gear 36, and a mating projection 326 mates with the mating hole 391. Therefore, the mating projection 326 and the mating hole 391 are fitted. The mating (fitting) of the mating projection 326 and the mating hole 391 provides the same effects as in the first preferred embodiment.

Figure 6:
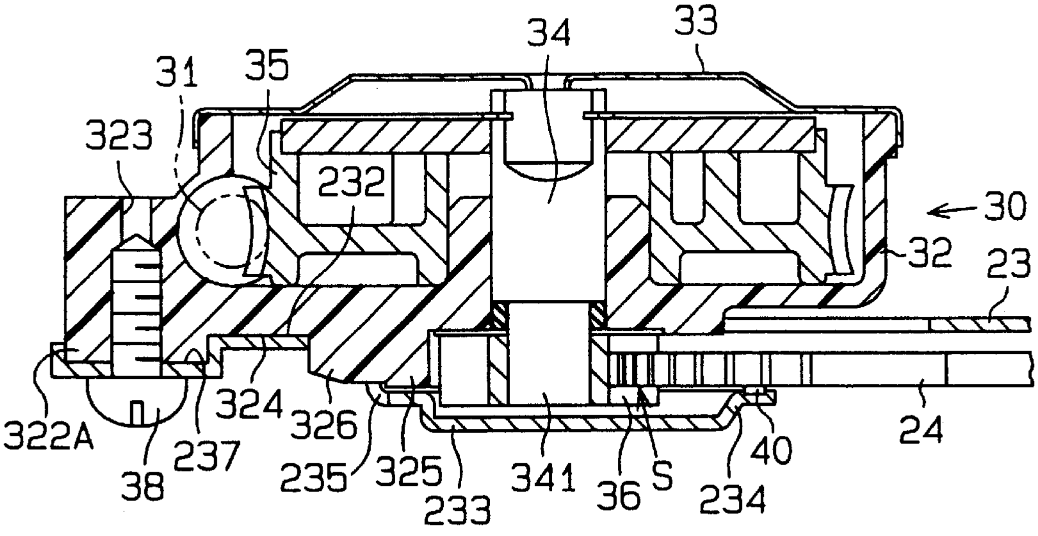
FIG. 6 is a sectional view showing an inner structure of a reciprocating drive device according to a fourth preferred embodiment of the present invention.

A fourth preferred embodiment illustrated in FIG. 6 will now be described. In FIG. 6, the same part as those in the first preferred embodiment have been given the same reference numerals as in the first preferred embodiment.

In the fourth embodiment, a mating recess 237 is formed in a part of the support base 23 opposite to the attachment part 322A on the line of the direction intersecting with the output shaft 34 from the meshing position S. The mating recess 237 mates with the attachment part 322A used as a mating projection. The mating recess 237 and the attachment part 322A are fitted in the vicinity of the driving gear 36. Consequently, the mating (fitting) of the mating recess 237 and the attachment part 322A provides the same effects as in the first preferred embodiment. Also, because the mating position between the mating recess 237 and the attachment part 322A is further away from the output shaft 34 as compared with the mating position between the mating projection 326 and the mating hole 235 described in the first preferred embodiment, the preventing effect of the relative rotation between the housing 32 and the support base 23 is further improved.

Figure 7:
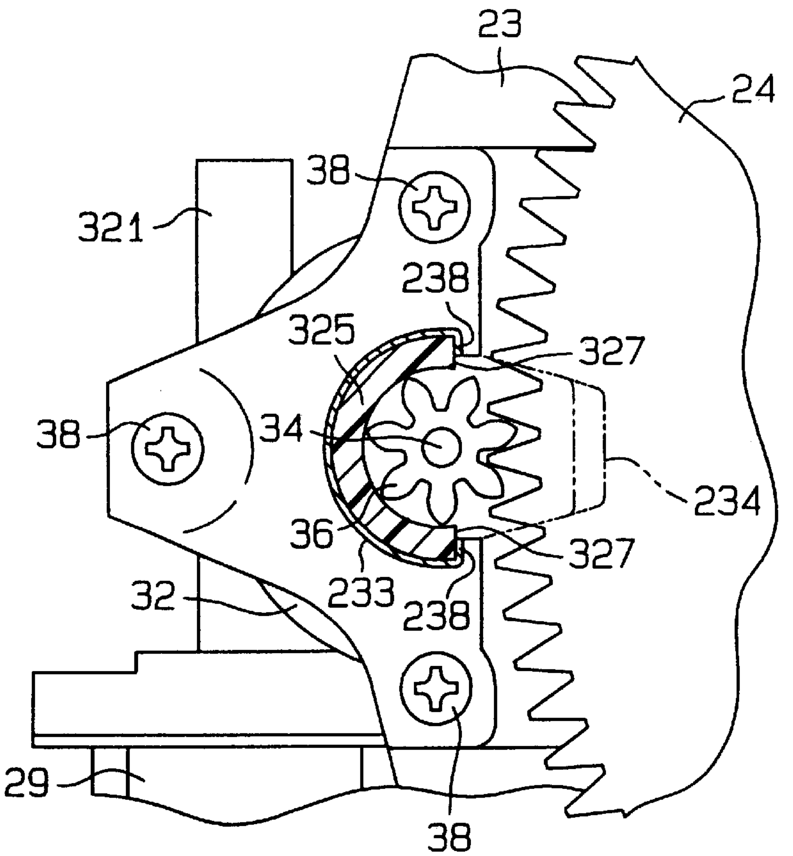
FIG. 7 is a rear view showing a main part of a reciprocating drive device according to a fifth preferred embodiment of the present invention.

A fifth preferred embodiment illustrated in FIG. 7 will now be described. In FIG. 7 the same parts as those in the first preferred embodiment have been given the same reference numerals.

In the fifth embodiment, a pair of engagement concavities 238 are formed in the cover part 233, and the engagement concavities 238 engage with both ends 327 of the reinforcing lip 325. The reinforcing lip 325 and the engagement concavities 238 constitute the relative-movement preventing unit. The relative-movement preventing unit constituted by the reinforcing lip 325 and the engagement concavities 238 prevents a relative movement between the support base 23 and the housing 32 both around the output shaft 34 and in the direction intersecting with the output shaft 34 from the meshing position S.

Figure 8:
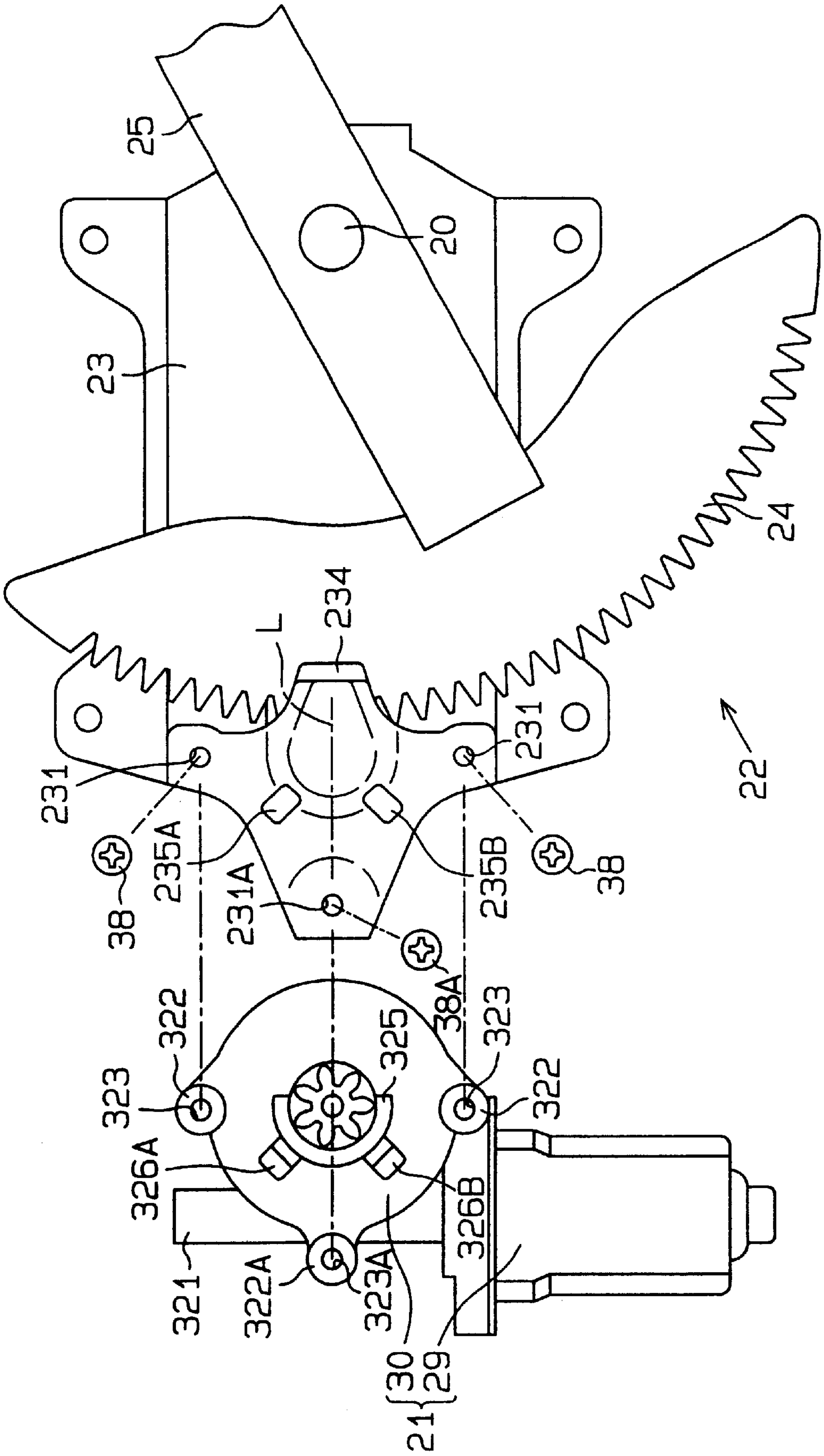
FIG. 8 is an exploded rear view showing a reciprocating drive device according to a sixth preferred embodiment of the present invention.
Figure 9A:
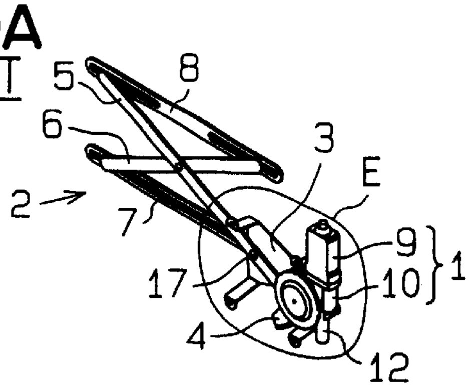
FIG. 9A PRIOR ART
FIG. 9A is a perspective view showing a conventional power window device.
Figure 9B:
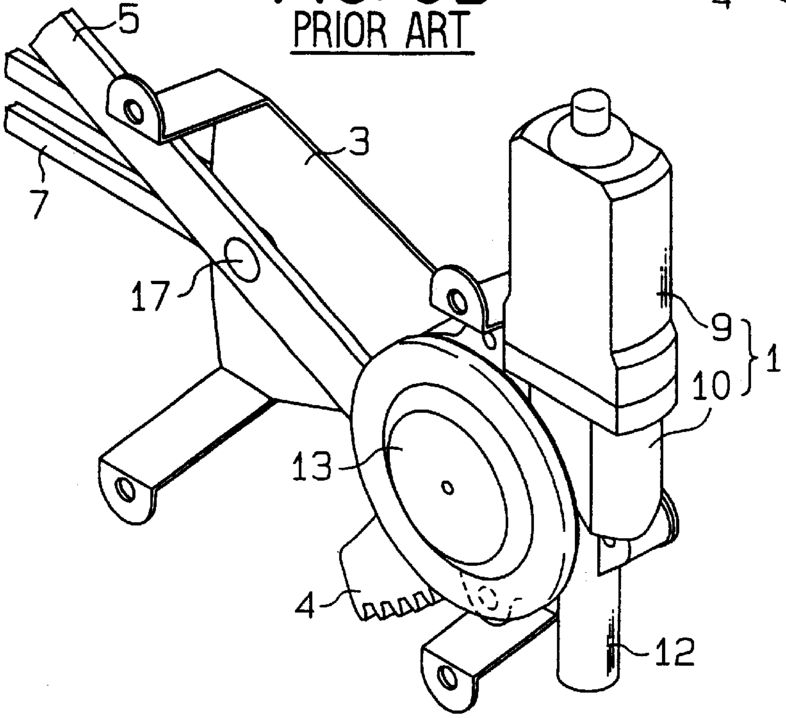
FIG. 9B PRIOR ART
FIG. 9B is an enlarged detail view of a portion shown by "E" in FIG. 9A.
Figure 10:
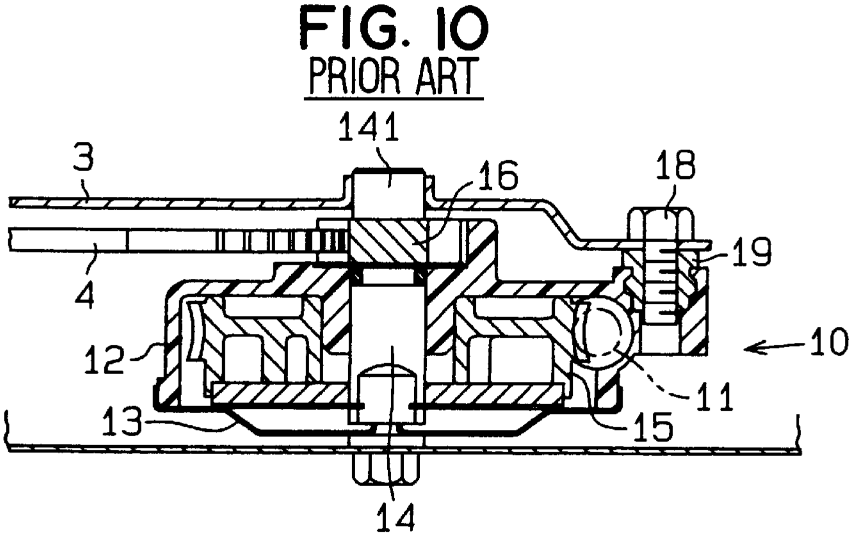
FIG. 10 PRIOR ART
FIG. 10 is a sectional view of an output part of the conventional power window device.

A sixth preferred embodiment illustrated in FIG. 8 will now be described. In FIG. 8, the same part as those in the first preferred embodiment have been given the same reference numerals.

In the sixth embodiment, a pair of mating projections 326A, 326B similar to the mating projection 326 of the first embodiment are formed to be connected to the reinforcing lip 325, and a pair of mating holes 235A, 235B similar to the mating hole 235 of the present invention are formed to be connected to the cover part 233. The mating projection 326A is fitted into the mating hole 235A, and the mating projection 326B is fitted into the mating hole 235B. The mating holes 235A, 235B are provided at positions left-right line-symmetrical relative to the direction line L intersecting with the output shaft 34 from the meshing position S. The mating projection 326A and 326B are provided at positions left-right line-symmetrical relative to the direction line L, too. This line-symmetrical disposition of the mating holes 235A, 235B and the mating projections 326A, 326B effectively prevents the relative movement between the support base 23 and the housing 32 in the direction intersecting with the output shaft 34 from the meshing position S. Also, The mating of the mating holes 235A, 235B and the mating projections 326A, 326B in two places serves as highly accurate positioning of the housing 32 with respect to the support base 23 and improves the ease of assembly and the accuracy of assembly of the motor 21 and the regulator 22 still further.

Although the present invention has been fully described in connection with the preferred embodiments thereof with reference to the accompanying drawings, it is to be noted that various changes and modifications will become apparent to those skilled in the art. For example:

(1) In the above-described first through third preferred embodiments, the mating projection 326 and the mating hole 235 may be disposed to be fitted so that they prevent only the relative rotation between the support base 23, 39 and the housing 32.

(2) In the above-described fourth preferred embodiment, a mating recess 237 may be provided on the side of the support base 23 at each of the attachment parts 322, 322A.

(3) A mating concavity may be provided on the housing side and a mating projection may be provided on the support base side.

(4) A mating projection 326 may be provided on a housing 32 having no reinforcing lip 325.

(5) The output shaft 34 and the driving gear 36 may be formed integrally.

(6) The present invention can be applied to reciprocating drive devices other than power window devices, for example, a sun roof driving device.

Such changes and modifications are to be understood as being within the scope of the present invention as defined by the appended claims.

What is claimed is:

1. A reciprocating drive device for reciprocating a drive member, comprising:

a motor including an output shaft having a housing, and a drive gear disposed outside the housing to be rotatable integrally with the output shaft;

a regulator having a driven gear meshing with the drive gear, the driven gear being operatively linked with the drive member;

a support base for supporting the driven gear and for fixing the housing;

a screw-fixing unit through which the housing is directly screwed to the support base; and a relative-movement preventing unit, being provided by an engagement between the support base and the housing, for preventing a relative movement between the support base and the housing.

2. The reciprocating drive device according to claim 1, wherein:

the relative-movement preventing unit includes a mating projection provided on one of the housing and the support base, and a mating concavity provided on the other of the housing and the support base; and the mating projection is fitted into the mating concavity when the housing is fixed to the support base by the screw-fixing unit.

3. The reciprocating drive device according to claim 2, wherein:

the mating projection has a projection end;

the mating concavity has a concavity end defining the matting concavity; and the projection end contacts the concavity end at least in a radial direction of the drive gear when the drive member locks.

4. The reciprocating drive device according to claim 2, wherein the mating projection and the mating concavity are fitted in a vicinity of the drive gear.

5. The reciprocating drive device according to claim 2, wherein:

the mating projection is provided on a facing surface of the housing at an interface between the support base and the housing in a vicinity of the output shaft; and the mating concavity is provided in a facing surface of the support base at the interface between the support base and the housing in a vicinity of the output shaft.

6. The reciprocating drive device according to claim 5, further comprising:

a circular arc-shaped reinforcing rib provided on the facing surface of the housing around said output shaft, wherein the mating projection is disposed to be connected to the reinforcing rib.

7. The reciprocating drive device according to claim 6, further comprising:

a cover part covering the drive gear and the reinforcing rib, wherein the cover part is disposed to be connected to the mating concavity.

8. The reciprocating drive device according to claim 7, wherein:

the cover part has a support bearing; and one end of the output shaft is rotatably supported in the support bearing of the cover part.

9. The reciprocating drive device according to claim 7, wherein:

the driven gear and the housing are disposed on opposite sides relative to the support base; and the cover part has a pressing part pressing the driven gear toward the support base.

10. The reciprocating drive device according to claim 2, wherein the mating projection and the mating concavity are disposed on an extending line intersecting with the output shaft from a meshing position where the drive gear and the driven gear mesh.

11. The reciprocating drive device according to claim 2, wherein:

the mating projection includes plural projection portions disposed at positions line-symmetrical relative to a line intersecting with the output shaft from a meshing position where the drive gear and the driven gear mesh; and the mating concavity includes plural concavity portions provided to correspond to the positions of the plural projection portions.

12. The reciprocating drive device according to claim 1, wherein:

the screw-fixing unit includes a plurality of screws;

the support base includes a plurality of through holes from which said screws are screwed into the housing; and a periphery of at least one screw of the screw-fixing unit contacts an inner periphery of one of the through holes in the support base.

13. The reciprocating drive device according to claim 1, wherein:

the support base is made of metal; and the housing is made of synthetic resin.

14. The reciprocating drive device according to claim 1, wherein the reciprocating drive device is a power window device for reciprocating a window glass.

15. A reciprocating drive device for reciprocating a drive member, comprising:

a motor including an output shaft having a housing made of resin, and a drive gear disposed to be rotatable integrally with the output shaft;

a regulator having a driven gear meshing with the drive gear, the driven gear being operatively linked with the drive member;

a support base for supporting the driven gear, said support base being connected to the housing;

a screw-fixing means through which the housing and the support base are directly screwed; and relative-movement preventing means for preventing a relative movement between the support base and the housing, the relative-movement preventing means being an engagement between the support base and the housing.

* * * * *

UNITED STATES PATENT AND TRADEMARK OFFICE

CERTIFICATE OF CORRECTION

PATENT NO. : 6,320,335 B1
DATED : November 20, 2001
INVENTOR(S) : Saitou

It is certified that error appears in the above-identified patent and that said Letters Patent is hereby corrected as shown below:

Title page,
Item [30], Foreign Application Priority Data, "Sep. 19, 1999" should read
-- Sep. 21, 1999 --

Signed and Sealed this

Twentieth Day of July, 2004

JON W. DUDAS
*Acting Director of the United States Patent and Trademark Office*